United States Patent
Everingham (12)

(10) Patent No.: US 6,453,667 B1
(45) Date of Patent: Sep. 24, 2002

(54) AIR CONTROL VALVE AND METHOD FOR ENGINE EXHAUST GAS TREATMENT

(75) Inventor: Gary Everingham, Chatham (CA)

(73) Assignee: Siemens Automotive Inc., Chatham (CA)

( * ) Notice: Subject to any disclaimer, the term of this patent is extended or adjusted under 35 U.S.C. 154(b) by 0 days.

(21) Appl. No.: 09/838,081

(22) Filed: Apr. 19, 2001

Related U.S. Application Data

(60) Provisional application No. 60/229,936, filed on Sep. 1, 2000, and provisional application No. 60/232,347, filed on Sep. 14, 2000.

(51) Int. Cl.⁷ .................................................. F01N 3/00
(52) U.S. Cl. ............................ 60/289; 60/291; 60/307; 251/82
(58) Field of Search ........................ 60/289, 290, 291, 60/293, 307; 251/82, 129.01

(56) References Cited

U.S. PATENT DOCUMENTS

| | | | | |
|---|---|---|---|---|
| 3,795,230 A | * | 3/1974 | Yoshimura .................. 123/327 |
| 3,805,522 A | * | 4/1974 | Sheppard ................ 137/119.03 |
| 3,869,858 A | * | 3/1975 | Goto et al. .............. 137/625.5 |
| 3,948,045 A | * | 4/1976 | Budinski et al. ......... 137/627.5 |
| 4,147,030 A | * | 4/1979 | Katahira et al. ............... 60/290 |
| 4,178,755 A | * | 12/1979 | Klimazewski et al. ........ 60/284 |
| 4,180,975 A | | 1/1980 | Takagi et al. ................. 60/290 |
| 4,269,028 A | * | 5/1981 | Hattori ......................... 251/31 |
| 4,270,347 A | * | 6/1981 | Fukuba et al. ................ 60/276 |
| 4,342,194 A | * | 8/1982 | Paddock et al. ........ 137/625.42 |
| 4,376,427 A | | 3/1983 | Mizuno ....................... 123/339 |
| 4,464,896 A | | 8/1984 | Kubota ........................ 60/290 |
| 5,065,575 A | * | 11/1991 | Cook et al. .................. 137/510 |
| 5,203,872 A | * | 4/1993 | Naffziger ..................... 251/82 |
| 5,271,221 A | | 12/1993 | Lyon ........................... 60/274 |
| 5,390,697 A | | 2/1995 | Muschelknautz ........... 137/494 |
| 5,421,366 A | | 6/1995 | Naffziger et al. ......... 137/614.2 |
| 5,491,976 A | * | 2/1996 | Rock et al. .................. 137/506 |
| 5,533,707 A | * | 7/1996 | Beesley ................. 251/129.15 |
| 5,937,834 A | | 8/1999 | Oto ........................ 123/568.18 |

FOREIGN PATENT DOCUMENTS

DE 40 25 267 A1 2/1992 ........... F16K/15/18

OTHER PUBLICATIONS

European Search Report, Application No. EP 01 20 3115, dated of Search Nov. 27, 2001.

* cited by examiner

*Primary Examiner*—Thomas Denion
*Assistant Examiner*—Diem Tran

(57) ABSTRACT

Various embodiments of air control valves are disclosed. Each has a mechanism, controlled by a solenoid and by the difference between fluid pressure at its inlet and fluid pressure at its outlet, for allowing communication between an air pump and an exhaust gas treatment system as long as fluid pressure at the outlet does not exceed fluid pressure at the inlet by more than a predetermined difference during absence of a predetermined electric energization of the solenoid, for disallowing communication between the air pump and the gas treatment system during presence of the predetermined electric energization of the solenoid, and for disallowing communication between the air pump and the gas treatment system whenever fluid pressure at the outlet exceeds fluid pressure at the inlet by more than the predetermined difference.

23 Claims, 5 Drawing Sheets

AIR CONTROL VALVE AND METHOD FOR ENGINE EXHAUST GAS TREATMENT

CROSS REFERENCE TO RELATED APPLICATIONS

This application claims the benefit of the earlier filing date of U.S. Provisional Application Ser. No. 60/229,936 filed Sep. 1, 2000 and of U.S. Provisional Application Serial No. 60/232,347 filed Sep. 14, 2000, both of which are hereby incorporated by reference.

FIELD OF THE INVENTION

This invention relates generally to treatment of exhaust gas produced by an internal combustion engine, and particularly to an air control valve for controlling flow between an air pump and an exhaust gas treatment system in an automotive vehicle.

BACKGROUND AND SUMMARY OF THE INVENTION

Certain operating modes of an internal combustion engine of an automotive vehicle may require the introduction of air directly into a catalytic exhaust gas treatment system to make the treatment as effective as possible. For example, introducing air at cold start may facilitate oxidizing hydrocarbons in the exhaust gas before the catalytic treatment is able to be fully effective. Such air is introduced under pressure into the exhaust gas stream ahead of a catalyst by an air pump that is powered in any appropriate manner, often electrically. The air that is introduced in this way is sometimes referred to as secondary air. It may be undesirable to connect certain air pumps directly to the exhaust gas stream, in which case such an air pump may be connected to the exhaust gas stream through a control valve. Such a valve should possess a predictable and rapid response.

It is toward providing such a valve that the present invention is directed.

A general aspect of the invention relates to an electric operated control valve for controlling fluid communication between an air pump and a gas treatment system that treats exhaust gas produced by an internal combustion engine.

Within this general aspect is the more specific aspect of the valve comprising a body having an inlet for communicating the valve to the air pump and an outlet for communicating the valve to the gas treatment system, an electric operator, and a reed that is disposed between the inlet and the outlet and that, during absence of a predetermined electric energization of the operator, is normally open to allow communication between the air pump and the gas treatment system but is forced closed in response to fluid pressure at the outlet exceeding fluid pressure at the inlet by more than a predetermined amount, and that during presence of the predetermined electric energization of the operator, is forced closed to disallow communication between the air pump and the gas treatment system.

Another aspect relates to the valve mechanism being controlled by the operator and by the difference between fluid pressure at the inlet and fluid pressure at the outlet. The mechanism allows communication between the air pump and the gas treatment system as long as fluid pressure at the outlet does not exceed fluid pressure at the inlet by more than a predetermined difference during absence of a predetermined electric energization of the operator, disallows communication between the air pump and the gas treatment system during presence of the predetermined electric energization of the operator, and disallows communication between the air pump and the gas treatment system whenever fluid pressure at the outlet exceeds fluid pressure at the inlet by more than the predetermined difference.

Still another aspect relates to a mechanism for such a valve where a reed that is normally open is electromagnetically coupled with the operator to operate from open to closed in response to the predetermined electric energization of the operator, and that during absence of the predetermined electric energization of the operator, operates from open to closed in response to fluid pressure at the outlet exceeding fluid pressure at the inlet by more than the predetermined difference.

Still another aspect relates to a method for controlling fluid communication between an air pump and a gas treatment system that treats exhaust gas produced by an internal combustion engine. The method comprises: allowing communication between the air pump and the gas treatment system as long as fluid pressure at the outlet does not exceed fluid pressure at the inlet by more than a predetermined difference during absence of a predetermined electric energization of an electric operator; disallowing communication between the air pump and the gas treatment system during presence of the predetermined electric energization of the operator; and disallowing communication between the air pump and the gas treatment system whenever fluid pressure at the outlet exceeds fluid pressure at the inlet by more than the predetermined difference.

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
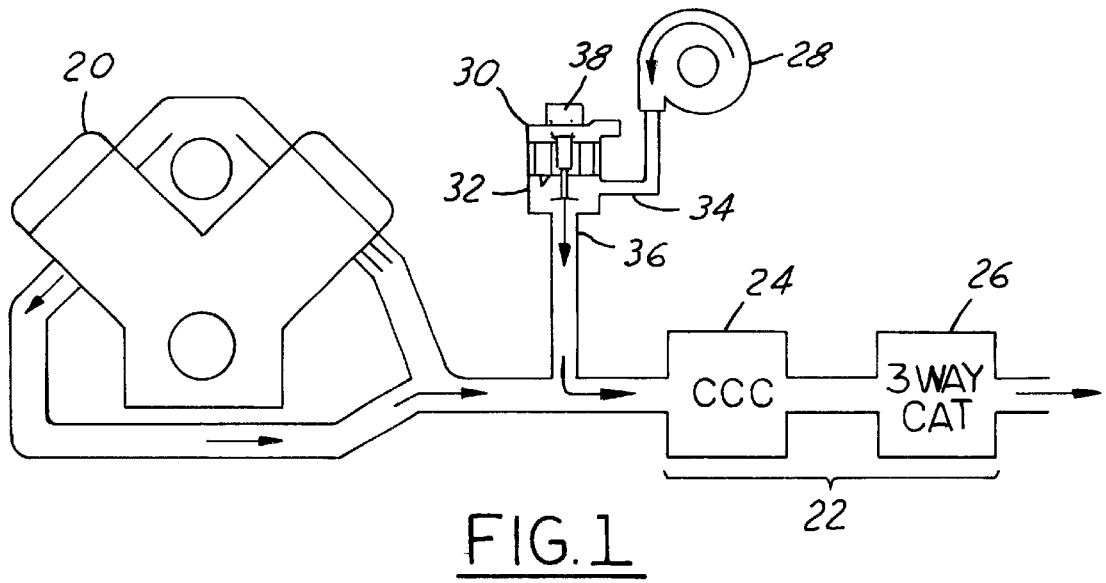
FIG. 1 is a schematic diagram of an internal combustion engine in an automotive vehicle including a representative exhaust gas treatment system and an air control valve according to principles of the invention.

FIG. 1 shows an automotive vehicle internal combustion engine 20 including an exhaust gas treatment system 22 for treating exhaust gas produced by engine 20. Treatment system 22 comprises, by way of example, a close-coupled catalyst 24 and a three-way catalyst 26, in that order along the exhaust gas stream from engine 20.

Certain operating modes of engine 20 may require the introduction of air directly into system 22 to make gas treatment effective, either before or after one or both catalysts become fully effective. Such air is introduced under pressure into the exhaust gas stream ahead of catalyst 24 by an air pump 28 that is powered in any appropriate manner, often electrically. The air that is introduced in this way is sometimes referred to as secondary air. It may be undesirable to connect certain air pumps directly to the exhaust gas stream, in which case such an air pump may be connected to the exhaust gas stream through a control valve.

FIG. 1 shows a generic form of the inventive air control valve 30. Valve 30 comprises a body 32 having an inlet 34 for communicating the valve to air pump 28 and an outlet 36 for communicating the valve to treatment system 22. The valve is electrically operated and hence further comprises an electric operator 38.

Figure 2:
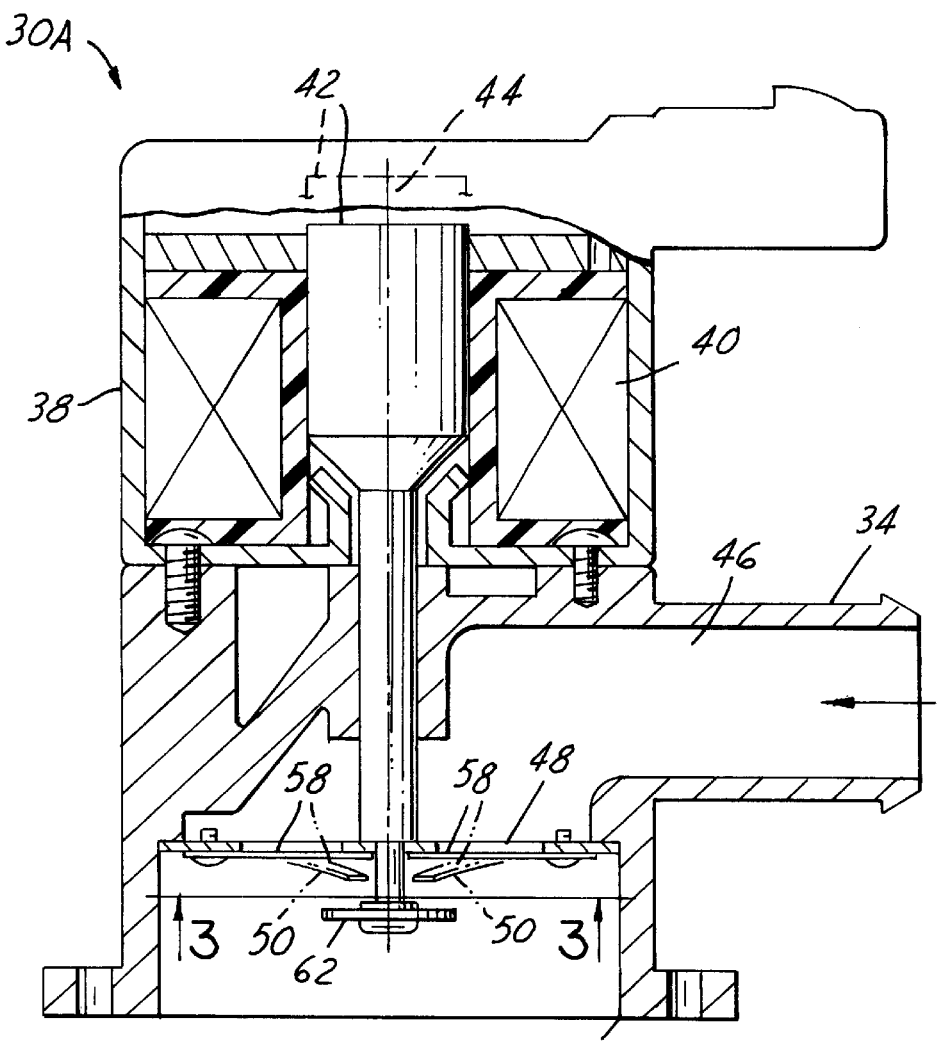
FIG. 2 is a longitudinal cross section view through a first embodiment of air control valve according to principles of the invention.
Figure 3:
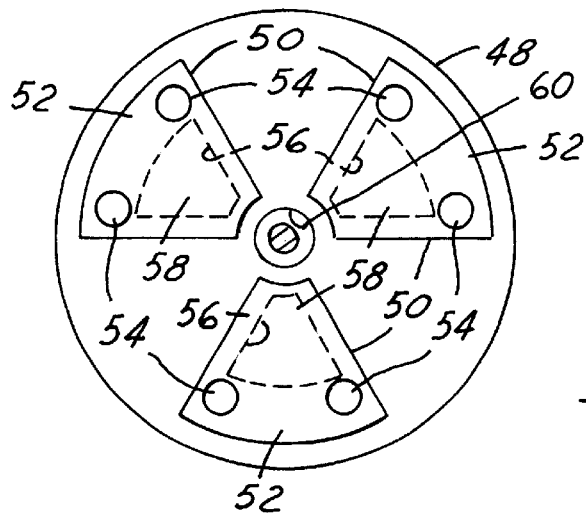
FIG. 3 is a view in the direction of arrows 3—3 in FIG. 2.

A first embodiment 30A of air control valve 30 according to principles of the invention is shown in FIGS. 2 and 3. Electric operator 38 comprises a solenoid that has a bobbin-mounted electric coil 40 and an armature 42. FIG. 2 shows a condition where coil 40 is not electrically energized. Armature 42 is guided for linear motion along an imaginary centerline 44. When a predetermined electrical energization is applied to coil 40, armature 42 is displaced from a first position as shown in FIG. 2 along centerline 44 to a second position partially depicted by a broken line.

Body 32 comprises a passage 46 extending between inlet 34 and outlet 36. Proximate outlet 36, the centerline of passage 46 is coincident with centerline 44, and there, a mounting member 48, such as a flat disk, is disposed transversely across the passage. Member 48 provides a mounting for one or more reeds 50. The example of FIGS. 2 and 3 comprises three individual reeds 50.

Each reed 50 is normally flat, comprising a base 52 held fast, using rivets 54 for example, to member 48 adjacent a respective through-aperture 56 in member 48. The reeds are disposed on the face of member 48 that is toward outlet port 36. Each reed 50. further comprises an arm 58 that extends from its base 52 to assume a closing relation to the respective through-aperture 56. Member 48 comprises a centrally located hole 60 through which a distal end of armature 42 passes.

Each base 52 is disposed radially outward of centerline 44, and each arm 58 extends radially inward to a free end that stops short of armature 42. An element 62, such as a washer, is disposed on the distal end of armature 42 beyond the free ends of the reeds relative to hole 60. Element 62 radially overlaps the free ends of all arms 58.

Reeds 50 are fabricated from a material that is inherently resilient flexible for assuming a certain curvature toward outlet 36 as shown in FIG. 2 when subjected to certain external forces, as will be explained.

Valve 30A operates in the following manner. During absence of a predetermined electric energization of coil 40 and absence of pressure differential between inlet 34 and outlet 36, armature 42 and reeds 50 assume a condition as shown by solid lines. With arms 58 in closing relation to through-apertures 56, reeds 50 assume a normally closed position that disallows communication between air pump 28 and treatment system 22.

As pump 28 develops pressure exceeding that ahead of catalyst 24 by a predetermined amount during continued absence of the predetermined electric energization of coil 40, reeds 50 being to flex open, allowing pumped air to pass through valve 30A into treatment system 22. Whenever the pressure differential falls below the predetermined amount during continued absence of the predetermined energization of coil 40, arms 58 will relax to lie flat against member 48 in covering relation to through-apertures 56, thereby causing reeds 50 to close the through-apertures.

Whenever the predetermined energization is applied to coil 40, armature 42 moves from the first position to the second position, and that motion forces the reeds, if open, closed against member 48. As armature 42 moves, the perimeter margin of element 62 engages the free ends of the flexed arms 58, forcing them substantially flat against member 48. When the predetermined energization of coil 40 ceases, armature 42 is released from its second posit-on, and returns to its first position. This allows flow through the valve to once again be solely a function of the pressure difference between the valve inlet and the valve outlet.

Figure 4:
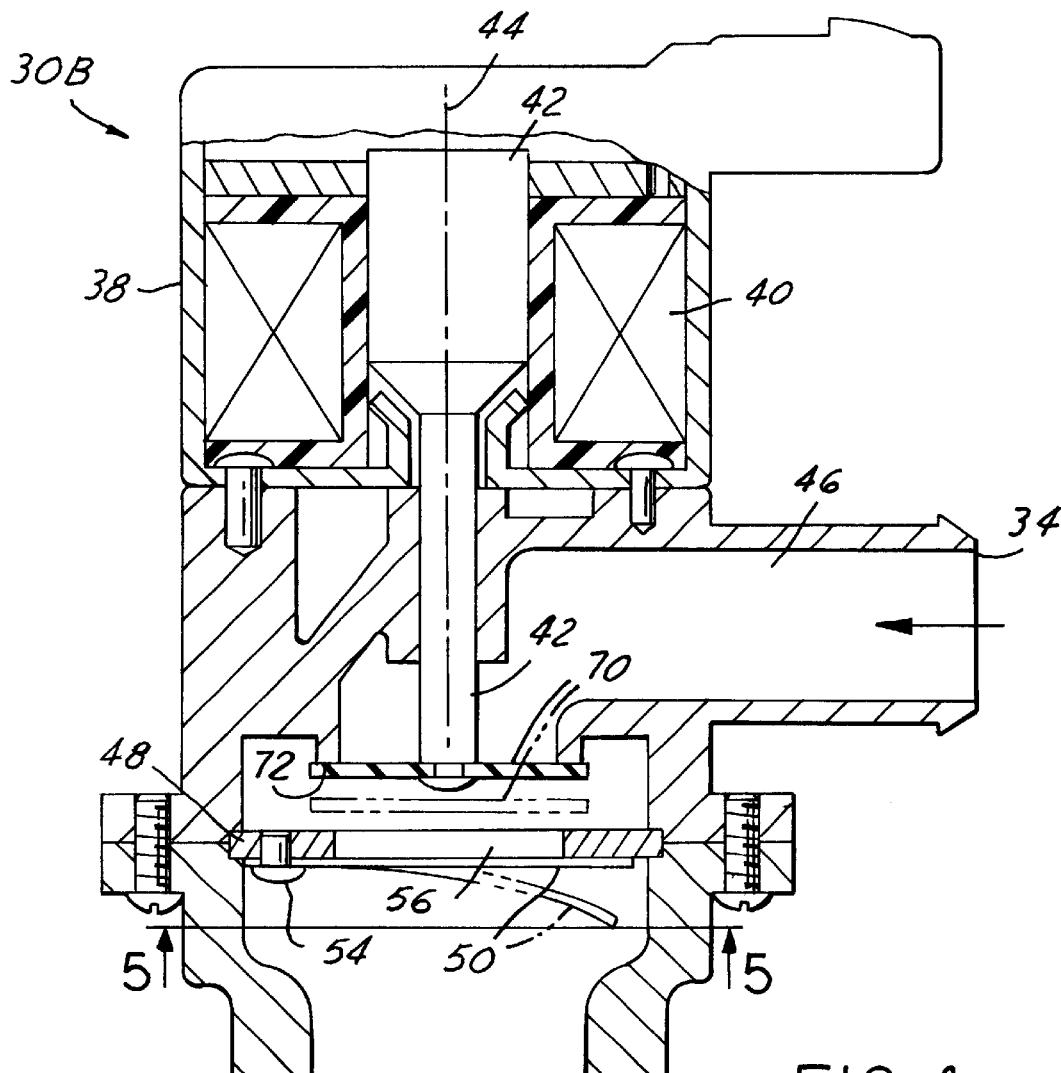
FIG. 4 is a longitudinal cross section view through a second embodiment of air control valve according to principles of the invention.
Figure 5:
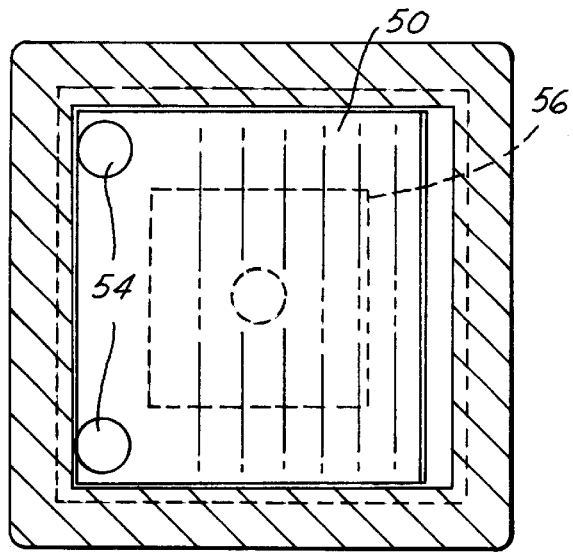
FIG. 5 is a view in the direction of arrows 5—5 in FIG. 4.

A second embodiment 30B of air control valve 30 according to principles of the invention is shown in FIGS. 4 and 5. Valve 30B comprises several of the same parts as valve 30A, and they are marked by the same reference numerals. Mounting member 48 of valve 30B differs from its counterpart in valve 30A in that it comprises a single through-aperture 56 having a substantially square shape. A single reed 50, also of substantially square shape, is held fast along one side margin to a corresponding side margin of member 48 by rivets 54. Reed 50 is fabricated from a material that is inherently resilient. It is nominally flat but can flex to assume a certain curvature toward outlet 36 as shown by broken line position in FIG. 4 when subjected to certain external forces.

Valve 30B further comprises a further valve element 70 at the distal end of armature 42. FIG. 4 shows element 70 in second position seated on a seat 72 that circumscribes passage 46, thereby disallowing communication between inlet 34 and outlet 36. This is the condition that occurs when the predetermined energization is applied to coil 40. When the predetermined energization applied to coil 40 ceases, armature 42 returns to its first position (shown by broken lines), unseating valve element 70 from seat 72 in the process, to allow flow through passage 46.

Whenever valve element 70 allows flow through valve 30B, pressure differential between inlet 34 and outlet 36 acts on reed 50. The reed is effective to disallow flow from air pump 28 to gas treatment system 22 except when the fluid pressure at inlet 34 exceeds that at outlet 36 by more than a predetermined difference. When the pressure differential begins to increasingly exceed that predetermined difference, reed 50 begins to increasingly flex to allow increasing flow through the valve.

Figure 6:
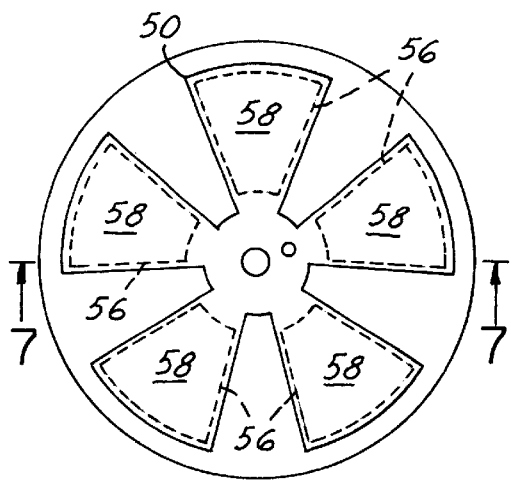
FIG. 6 shows a modified form for FIG. 5.
Figure 7:
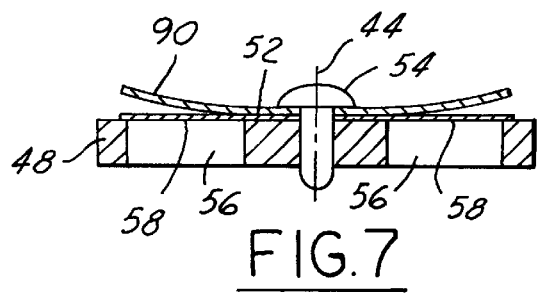
FIG. 7 is a cross section view in the direction of arrows 7—7 in FIG. 6.
Figure 10:
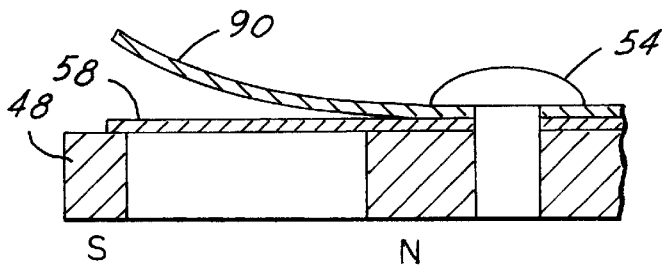
FIG. 10 is an enlarged cross section view in the direction of arrows 10—10 in FIG. 9.
Figure 11:
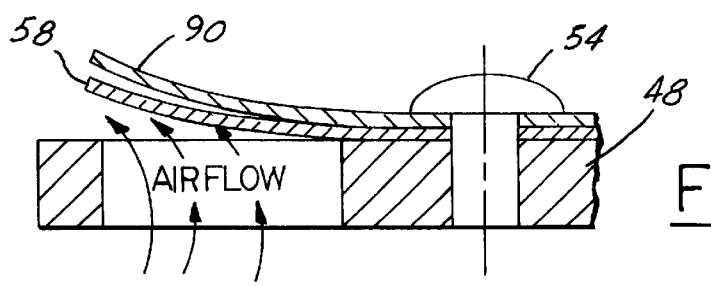
FIG. 11 is a view like FIG. 10, but showing a different operating condition.
Figure 8:
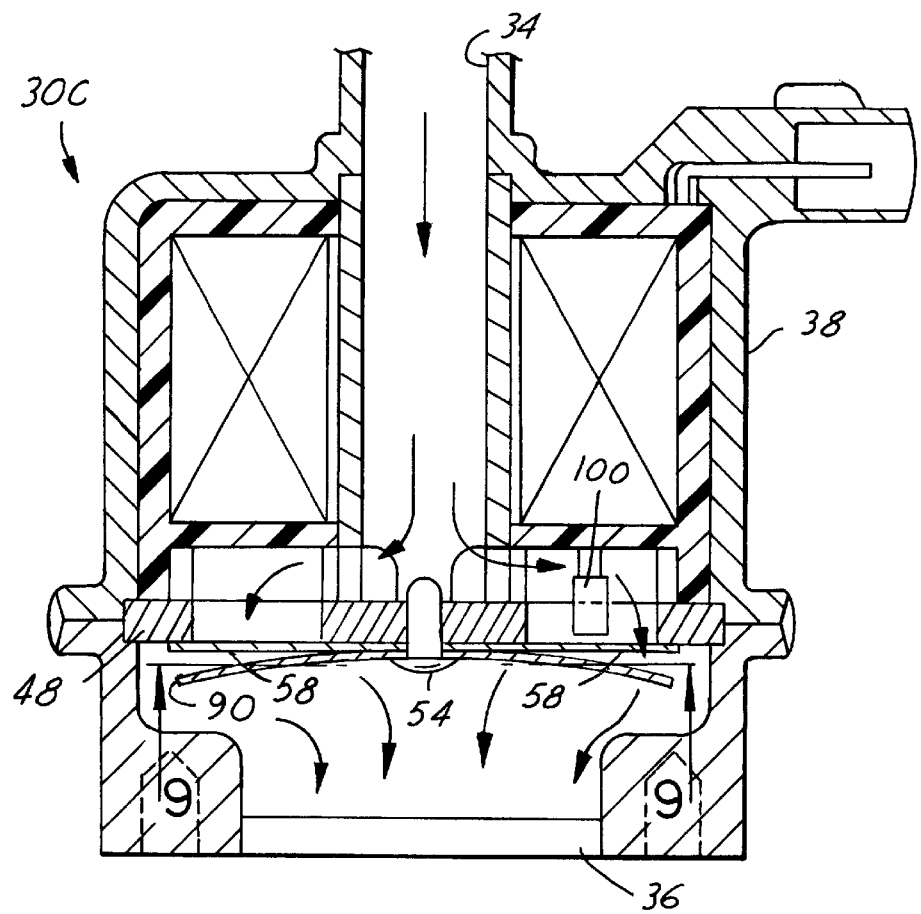
FIG. 8 is a longitudinal cross section view through a third embodiment of air control valve according to principles of the invention.
Figure 9:
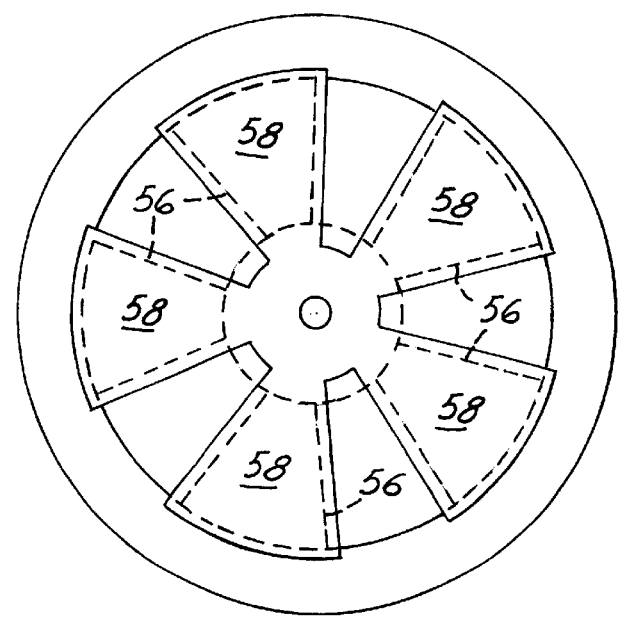
FIG. 9 is a view in the direction of arrows 9—9 in FIG. 8.

FIGS. 6 and 7 show a modification of reed 50 and mounting member 48 for valve 30B. Member 48 comprises five through-apertures 56 arranged circumferentially about centerline 44, and reed 50 comprises five arms 58 that extend radially outward from a base 52 at the center of the reed that is held fast to the center of member 48 by a rivet 54. The arms are nominally flat, as shown in FIG. 7, to close the through-apertures but can flex to curvatures whenever the fluid pressure at inlet 34 exceeds that at outlet 36 by more than the predetermined difference while valve element 70 is unseated from seat 72. FIG. 7 also shows a keeper 90, to be more fully explained, associated with reed 50.

FIGS. 8, 9, 10, and 11 show a third embodiment 30C of air control valve 30 according to principles of the invention. Valve 30C comprises several of the same parts as valves 30A and 30B, and they are marked by the same reference numerals. Mounting member 48 is disposed closer to coil 40, and it and reed 50 are arranged similar to reed 50 of FIGS. 6 and 7. Reed 50 of valve 30C however is ferromagnetic in addition to being resiliently flexible.

The reed arms 58 are normally flat for closing the through-apertures, but are electromagnetically coupled with coil 40 so as to be forced flat against mounting member 48 in response to the predetermined electric energization of coil 40 even when the pressure differential between inlet 34 and outlet 36 would otherwise flex the arms toward curvature for allowing flow through the valve. During absence of the predetermined electric energization of coil 40, the arms will flex from closed to open in response to fluid pressure at inlet 34 exceeding fluid pressure at outlet 36 by more than the predetermined difference. A curved keeper 90 is fastened by rivet 54 over reed 50 to limit the extent to which the individual reed elements can flex open.

Figure 12:
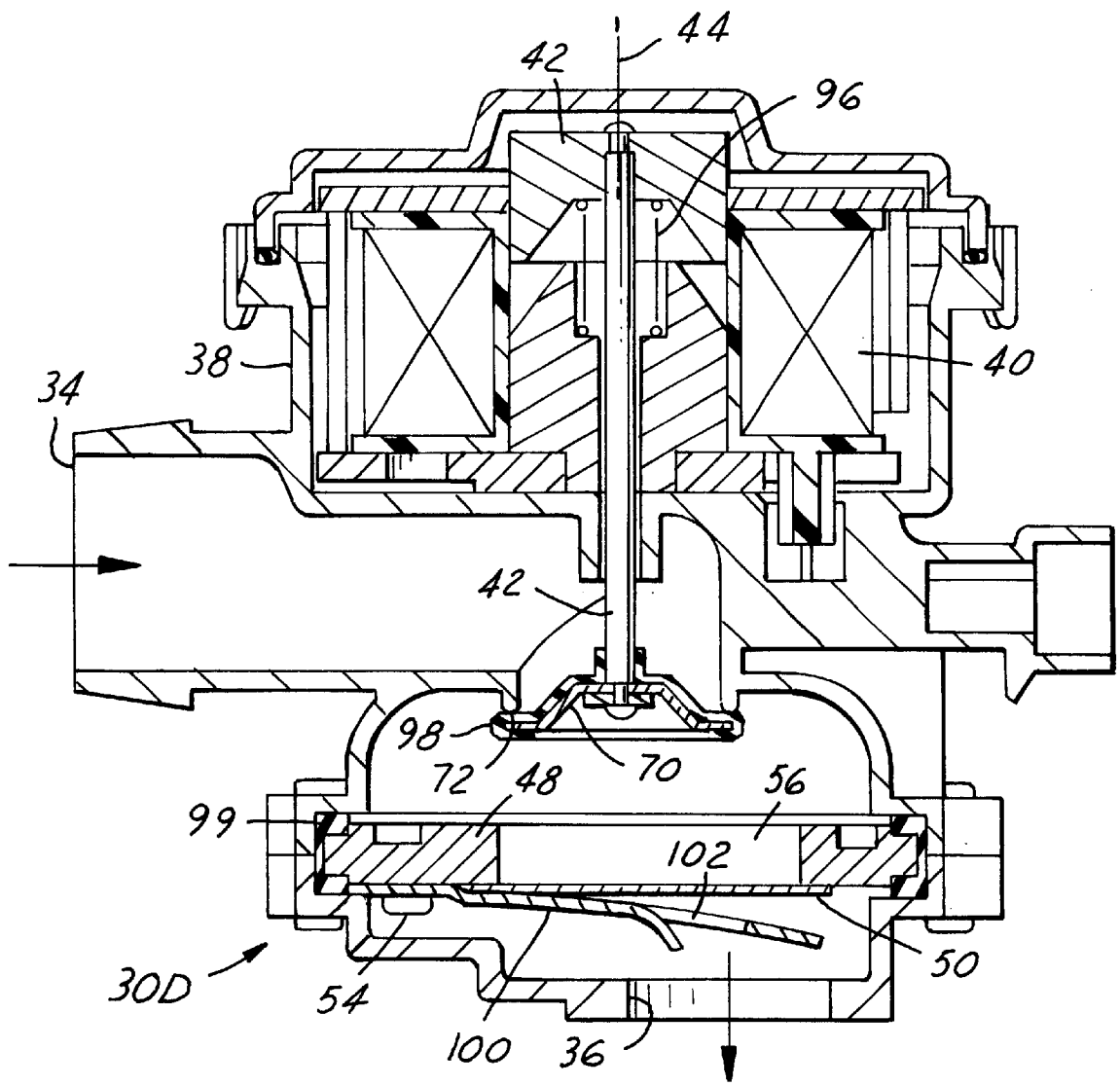
FIG. 12 is a longitudinal cross section view through a fourth embodiment of air control valve according to principles of the invention.

FIG. 12 shows an embodiment 30D that is similar to embodiment 30B. Like reference numerals are used to designate like parts. A spring 96 biases valve element 70 closed, as shown. A perimeter seal 98 is disposed on valve element 70 for sealing against seat 72. A perimeter seal 99 seals the perimeter of mounting member 48 to the valve body. Reed 50 is fastened, at one side, to the underside of mounting member 48 and a keeper 100 is also fastened to the mounting member to underlie the reed. Reed 50 is shown closing the opening 56 through mounting member 48. Whenever reed 50 flexes open in the same manner as in embodiment 30B, the extent to which it can flex is limited by abutment with keeper 100. The keeper is formed to a rigid contour matching that of the reed when the reed is flexed against the keeper. When the reed is being flexed against the keeper and conditions change in a way that should cause the reed to close, certain potential undesired influences on reed closure may be avoided by perforating the keeper in any suitable manner, such as by lancing a through-opening 102 in a central area of the keeper.

In any of the embodiments a motion detector 100 may be associated with the reed to monitor motion, and or a motion detector (not shown) may be associated with the armature to monitor armature motion. Failure to sense reed and/or armature motion in certain modes of operation may be indicative of a fault that can be signaled and logged by an on-board computer.

While the foregoing has described a preferred embodiment of the present invention, it is to be appreciated that the inventive principles may be practiced in any form that falls within the scope of the following claims.

What is claimed is:

1. An electric operated control valve for controlling fluid communication between an air pump and a gas treatment system that treats exhaust gas produced by an internal combustion engine, the valve comprising:

a body having an inlet for communicating the valve to the air pump and an outlet for communicating the valve to the gas treatment system;

an electric operator;

a reed that is disposed between the inlet and the outlet and that, during absence of a predetermined electric energization of the operator, opens to allow communication between the air pump and the gas treatment system but is forced closed in response to fluid pressure at the outlet exceeding fluid pressure at the inlet by more than a predetermined amount to disallow communication between the air pump and the gas treatment system, and that during presence of the predetermined electric energization of the operator, is forced closed to disallow communication between the air pump and the gas treatment system.

2. A valve as set forth in claim 1 in which the operator comprises an armature that moves between a first position assumed during absence of the predetermined energization of the operator and a second position assumed during presence of the predetermined energization of the operator, and that forces the reed closed upon assuming the second position.

3. A valve as set forth in claim 2 in which the valve comprises a mounting for the reed, the mounting comprises a member disposed transversely across a passage extending through the body between the inlet and the outlet, the reed comprises a base held fast to the member adjacent a through-aperture in the member, and the reed further comprises an arm that extends from the base to assume a non-closing relation to the through-aperture when open while the armature assumes the first position, but that is forced to assume a closing relation to the through-aperture when the armature assumes the second position.

4. A valve as set forth in claim 3 in which the member comprises plural through-apertures arranged circumferentially about an imaginary centerline of the passage, and the valve comprises plural reeds, each cooperatively associated with a respective through-aperture and comprising a respective base held fast to the member adjacent the respective through-aperture and a respective arm that extends from the respective base to assume a non-closing relation to the respective through-aperture when open while the armature assumes the first position, but that is forced to assume a closing relation to the respective through-aperture when the armature assumes the second position.

5. A valve as set forth in claim 4 in which the armature is arranged to move linearly along the centerline between the first position and the second position.

6. A valve as set forth in claim 5 in which the base of each reed is disposed radially outward of the centerline and the arm of each reed extends radially inward to a free end, and the armature comprises an element that acts in unison on the free ends of the reeds as the armature moves from the first position to the second position to force the reeds to assume closing relation to the respective through-apertures when the armature assumes the second position.

7. A valve as set forth in claim 6 in which the member comprises a central hole through which the armature passes, and the element that acts in unison on the free ends of the reeds is disposed beyond the free ends of the reeds relative to the central hole.

8. An electric operated control valve for controlling fluid communication between an air pump and a gas treatment system that treats exhaust gas produced by an internal combustion engine, the valve comprising:

a body having an inlet for communicating the valve to the air pump and an outlet for communicating the valve to the gas treatment system;

an electric operator;

a mechanism, controlled by the operator and by the difference between fluid pressure at the inlet and fluid pressure at the outlet, for allowing communication between the air pump and the gas treatment system as long as fluid pressure at the outlet does not exceed fluid pressure at the inlet by more than a predetermined difference during absence of a predetermined electric energization of the operator, for disallowing communication between the air pump and the gas treatment system during presence of the predetermined electric energization of the operator, and for disallowing communication between the air pump and the gas treatment system whenever fluid pressure at the outlet exceeds fluid pressure at the inlet by more than the predetermined difference.

9. A valve as set forth in claim 8 in which the mechanism comprises a first valve element that is operated by the operator to allow flow through a passage in the body between the inlet and the outlet during predetermined electric energization of the operator and to disallow flow through the passage in the absence of the predetermined energization of the operator, and a second valve element that is disposed in the passage and that is forced closed when fluid pressure at the outlet exceeds fluid pressure at the inlet by more than a predetermined amount while the first valve element is allowing flow through the passage.

10. A valve as set forth in claim 9 in which the second valve element is disposed in the passage between the first valve element and the outlet, and the first valve element is disposed in the passage between the second valve element and the inlet.

11. A valve as set forth in claim 9 in which the second valve element comprises a reed mounted on a member that is disposed transversely across the passage.

12. A valve as set forth in claim 11 in which the reed comprises a single reed element that selectively opens and closed a through-aperture in the member.

13. A valve as set forth in claim 11 in which the reed comprises plural reed elements each of which selectively opens and closes a respective through-aperture in the member.

14. A valve as set forth in claim 13 in which the reed comprises a base that is disposed on an imaginary centerline of the passage and held fast to a central portion of the member that is also disposed on the centerline.

15. A valve as set forth in claim 11 in which the reed comprises plural reed elements arranged circumferentially about on an imaginary centerline of the passage.

16. A valve as set forth in claim 8 in which the mechanism comprises a reed that is electromagnetically coupled with the operator and forced closed in response to the predetermined electric energization of the operator, and that during absence of the predetermined electric energization of the operator, operates from open to closed in response to fluid pressure at the outlet exceeding fluid pressure at the inlet by mare than the predetermined difference.

17. A valve as set forth in claim 16 in which the reed comprises plural reed elements each of which is electromagnetically coupled with the operator and formed closed in response to the predetermined electric energization of the operator.

18. A valve as set forth in claim 17 in which the reed elements, when open, bear against respective portions of a keeper that limits the extent to which the reed element can open.

19. A valve as set forth in claim 16 in which the reed is mounted on a member that is disposed transversely across the passage, and the reed comprises plural reed elements each of which is forced closed in response to the predetermined electric energization of toe operator.

20. A valve as set forth in claim 19 in which the reed comprises a base mounted on a member that is disposed transversely across the passage, and the reed comprises a reed element that is electromagnetically coupled with the operator and that is forced to close a through-aperture in the member during presence of the predetermined electric energization of the operator.

21. A valve as set forth in claim 20 including a keeper member against a portion of which the reed element bears when opening the through-hole to limit the extent to which the reed element can open.

22. An electric operated control valve for controlling fluid communication between an air pump and a gas treatment system that treats exhaust gas produced by an internal combustion engine, the valve comprising:

a body having an inlet for communicating the valve to the air pump and an outlet for communicating the valve to the gas treatment system;

an electric operator;

a reed that is electromagnetically coupled with the operator and forced closed in response to a predetermined electric energization of the operator, and that during absence of the predetermined electric energization of the operator, is forced closed in response to fluid pressure at the outlet exceeding fluid pressure at the inlet by more than a predetermined difference.

23. A method for controlling fluid communication between an air pump and a gas treatment system that treats exhaust gas produced by an internal combustion engine, the method comprising:

allowing communication between the air pump and the gas treatment system as long as fluid pressure at the outlet does not exceed fluid pressure at the inlet by more than a predetermined difference during absence of a predetermined electric energization of an electric operator, disallowing communication between the air pump and the gas treatment system during presence of the predetermined electric energization of the operator, and disallowing communication between the air pump and the gas treatment system whenever fluid pressure at the outlet exceeds fluid pressure at the inlet by more than the predetermined difference.

* * * * *